(12) United States Patent
Szajnowski

(10) Patent No.: US 6,751,639 B2
(45) Date of Patent: Jun. 15, 2004

(54) METHOD AND APPARATUS FOR GENERATING NUMBERS

(75) Inventor: Wieslaw Jerzy Szajnowski, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 434 days.

(21) Appl. No.: 09/734,181

(22) Filed: Dec. 12, 2000

(65) Prior Publication Data

US 2002/0035586 A1 Mar. 21, 2002

(30) Foreign Application Priority Data

Dec. 20, 1999 (GB) ............................................. 9930054

(51) Int. Cl.⁷ .............................................. G06F 1/02
(52) U.S. Cl. ....................................... 708/250; 708/255
(58) Field of Search ................................. 708/250, 255

(56) References Cited

U.S. PATENT DOCUMENTS

| 4,513,386 A | * | 4/1985 | Glazer ........................ 708/255 |
| 4,903,266 A | * | 2/1990 | Hack ........................... 714/719 |
| 4,905,176 A | * | 2/1990 | Schulz ......................... 708/252 |
| 5,251,165 A | * | 10/1993 | James, III .................... 708/250 |
| 5,706,218 A | * | 1/1998 | Hoffman ....................... 708/251 |
| 5,961,577 A | * | 10/1999 | Soenen et al. .............. 708/251 |

FOREIGN PATENT DOCUMENTS

GB    2 113 879    8/1983

* cited by examiner

Primary Examiner—David H. Malzahn
(74) Attorney, Agent, or Firm—Oblon, Spivak, McClelland, Maier & Neustadt, P.C.

(57) ABSTRACT

A non-repeating sequence of numbers having a substantially uniform distribution is obtained from a shift register whose contents are shifted, with the shifted digits being replaced by digits from a continuous sequence. The contents of the shift register are also replaced by their complement in dependence for the value of the most significant bit, so that the operations performed on the contents are represented by a tent map, thereby providing uniform distribution of the numbers. A randomising subsystem can be used to convert the output sequence into a random sequence.

15 Claims, 7 Drawing Sheets

METHOD AND APPARATUS FOR GENERATING NUMBERS

This invention relates to a method and apparatus for generating a non-repeating sequence of numbers, and particularly but not exclusively uncorrelated random numbers distributed uniformly over a specified interval.

Random numbers uniformly distributed over a set of integers $\{0, 1, \ldots, 2^{N-1}\}$ are required for stochastic simulation and also for spread-spectrum communications and radar. It is particularly desirable to provide truly random numbers in contrast to pseudorandom numbers that can be generated in accordance with the many existing techniques.

It is known that the use of random numbers as frequency-hopping patterns (codes) in radar results in low probability of intercept and enhanced resistance to intelligent jamming. Furthermore, when random numbers are subjected to suitable digital-to-analogue conversion, the resulting signals can be utilized for modulating radar transmissions, thereby providing radar waveforms with maximum unpredictability. Random waveforms are also useful for applications in multiuser environments where many similar or disparate systems operate in the same geographical region and those systems share, at least partly, the same wide frequency band.

Several classes of methods are known to generate truly random numbers by exploiting various physical phenomena such as thermal or avalanche noise, gaseous discharge, particle-induced scintillation, phase fluctuation of harmonic oscillators, etc.

The best known method for generating truly random numbers is based on converting a random signal produced by a physical noise source into a random binary waveform with two equiprobable values. Next the binary waveform is suitably sampled to yield a sequence of independent random bits occurring with equal probabilities. Random N-bit numbers with uniform distribution are then formed from this sequence by using different nonoverlapping sub-sequences of length N. In order to obtain a fast random number generator, N independent sequences of random bits may be utilized in a parallel scheme.

Because of inherent instabilities of physical noise sources and associated electronic circuits, it is not possible in practice to produce random binary sequences with equiprobable bits. Accordingly, numbers formed from such sequences will not be uniformly distributed. This results in inefficient use of frequency bands in communications and radar systems, increased predictability and other disadvantages.

To overcome this problem, various solutions have been proposed: either by incorporating a suitable stabilising feedback loop or by exploiting a 'divide-by-two' operation to obtain equiprobable bits. Although the technique employing a 'divide-by-two' operation can produce equiprobable bits, in general those bits may be correlated.

Another example of an implementation of a random number generator is the T7001 Random Number Generator chip, manufactured by AT&T. The principle of operation is based on the phase jitter of a free-running oscillator. As a result, the output bit stream is truly random, not pseudorandom. However, the output data rate is not sufficient for high-frequency operation.

It would, accordingly, be desirable to provide an apparatus and method for the generation of truly random numbers with uniform distribution suitable for spread-spectrum radar and other applications.

It would also be desirable to provide an apparatus and method for the generation of truly random numbers to yield frequency-hopping patterns and other suitable waveforms which are intended for application in multiuser environments, and/or are resistant to deliberate intelligent jamming, and/or have a low probability of detection and intercept.

It would also be desirable to provide a method and apparatus for generating a non-repeating sequence of uniformly-distributed numbers. Such numbers would be useful, for example, in the production of uncorrelated random numbers distributed uniformly over a specified interval, intended for example for simulation or other purposes.

Aspects of the present invention are set out in the accompanying claims.

According to a preferred embodiment of the invention, a truly random primary binary sequence, not necessarily with equiprobable bits, is generated. The bits of this sequence are manipulated in such a way as to obtain a plurality of uncorrelated binary sets with equiprobable bits. Uncorrelated chaotic N-bit binary numbers with uniform distribution are formed from those sets by suitably selecting subsets comprising N bits. The operational procedure employed for manipulating bits of a primary binary sequence is based on the chaotic behaviour of the so-called "tent" map, widely explored in chaos theory, resulting from a procedure known as "stretching and folding" to produce successive values. This operational procedure is implemented in an embodiment of the invention by a hybrid chaos generator.

Preferably, a truly random auxiliary binary sequence, not necessarily with equiprobable bits, is also generated. Each of the generated N-bit uncorrelated chaotic numbers and N bits suitably selected from this auxiliary sequence are XOR'ed bit by bit to obtain a resulting truly random N-bit binary number with uniform distribution and also with maximum unpredictability. Thus all the functions and operations required to achieve maximum unpredictability of generated numbers are implemented by a randomisation subsystem which operates on the chaotic numbers.

In an embodiment of the present invention, both the primary binary sequence and the auxiliary binary sequence are obtained from a single physical noise source.

As indicated above, the operational procedure for manipulating the bits of the preliminary binary sequence to obtain sets of equiprobable bits may be based on the tent map, the simplest form of which, shown in FIG. 1, is given by $$T(v) = \begin{cases} 2v, & 0 < v \le 1/2 \\ 2(1-v), & 1/2 < v < 1 \end{cases} \quad (1)$$

It is well known that a sequence of numbers, generated according to $$v_{k+1}=T(v_k), k=0, 1, \ldots \quad (2)$$

will be infinite and nonrepeating with uniform distribution over the unit (0,1)-interval, if the initial value $v_0$ has been suitably selected. Furthermore, the autocorrelation function of this sequence will be zero for all non-zero shifts. For example, an infinite and nonrepeating sequence $\{v_k; k=0, 1, \ldots\}$ can be obtained when the initial value $v_0$ is an irrational (or a transcendental) number.

Although the chaotic behaviour of sequences generated by the tent map T(v) can be observed experimentally in analogue electronic circuits, any attempt to generate such infinite and nonrepeating sequences digitally will fail because irrational numbers cannot be represented by finite binary numbers. As a result, a sequence of numbers generated by a digital implementation of equation (2) will be either periodic or it will quickly iterate to zero.

However, according to a preferred aspect of the present invention an infinite sequence of bits (the primary binary sequence) required to represent a suitable initial value $v_0$ is supplied, bit by bit, by a generator producing random, but not necessarily equiprobable, bits. Those bits are utilized sequentially by a finite-length shift register with suitable feedback arranged in such a way as to implement equation (2) governing the generation of a chaotic sequence. This technique is also applicable to other schemes employed to produce infinite and non-repeating chaotic sequences.

Arrangements embodying the present invention will now be described by way of example with reference to the accompanying drawings, in which.

Figure 2:
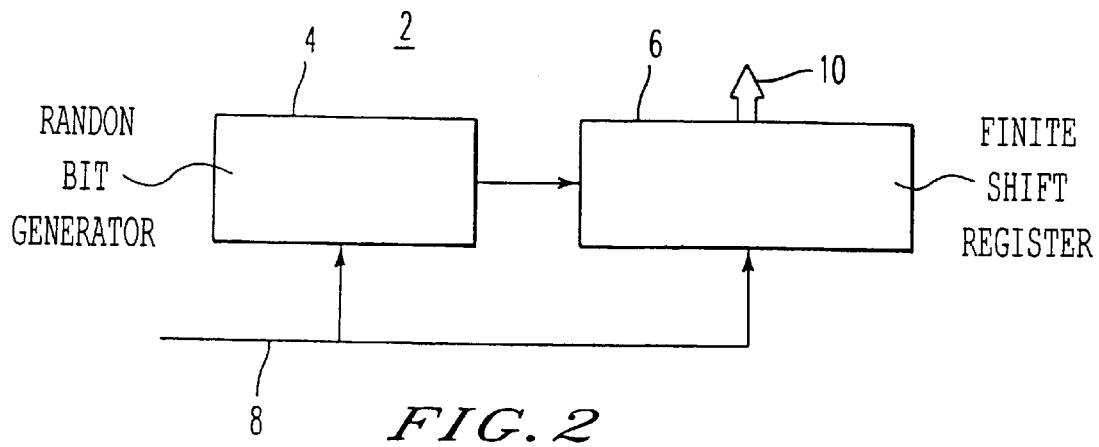
FIG. 2 is a functional block diagram of a hybrid chaotic number generator according to the invention.

FIG. 2 is a functional block diagram of a generic hybrid chaos generator 2 according to the invention, comprising a random bit generator (RBG) 4, supplying a primary binary sequence to a finite serial-in-parallel-out shift register (FSR) 6 with suitable feedback; both RBG 4 and FSR 6 are driven by a train of suitable clock pulses (CLK) supplied on line 8. Because the feedback operates on a finite number of bits, the hybrid chaos generator can only approximate in some sense its analogue prototype. However, because the operations performed on bits by the feedback circuit include bit reversal, the hybrid chaos generator is capable of producing at its parallel output 10 substantially uniformly distributed numbers.

Figure 3:
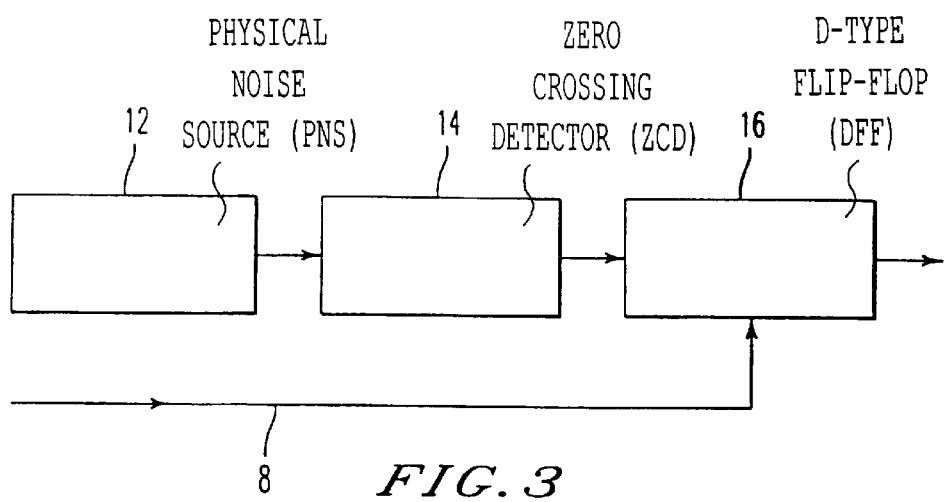
FIG. 3 is a block diagram of a generator of random binary sequences.
Figure 4A:
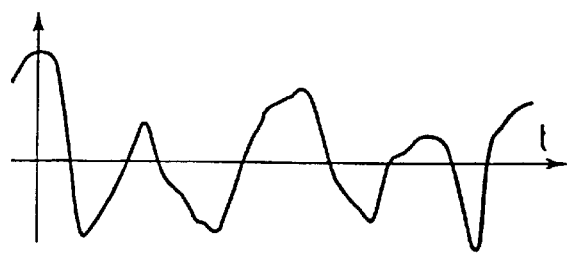
FIGS. 4A–4D show an exemplary noise signal s(t), a random binary waveform b(t) derived from that signal, and a sequence of random bits obtained by sampling the waveform b(t) at time instants determined by clock pulses (CLK)
Figure 4B:
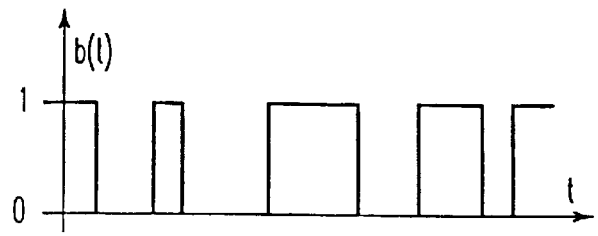
Figure 4C:
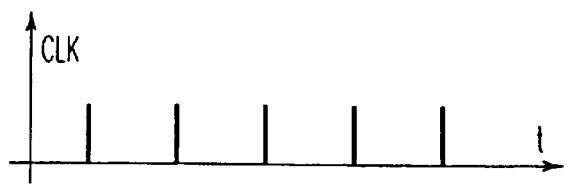
Figure 4D:
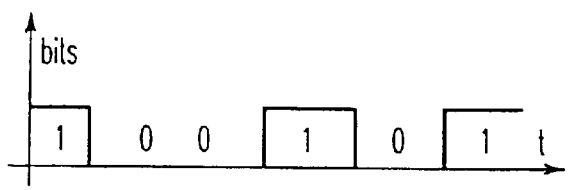

One convenient and inexpensive method to generate random binary sequences is based on level crossings of a random signal generated by a physical noise source. FIG. 3 shows an example of a generator of random binary sequences. The generator comprises a physical noise source (PNS) 12, a zero-crossing detector (ZCD) 14, which can be a comparator or a hard limiter, and a D-type flip-flop (DFF) 16 triggered by a train of suitable clock pulses (CLK) on line 8.

FIG. 4 shows a typical realization of a noise signal s(t), a random binary waveform b(t) defined by zero crossings of that signal and a sequence of random bits obtained by using the DFF 16 to sample the binary waveform b(t) at the time instants determined by the clock pulses (CLK).

Figure 5:
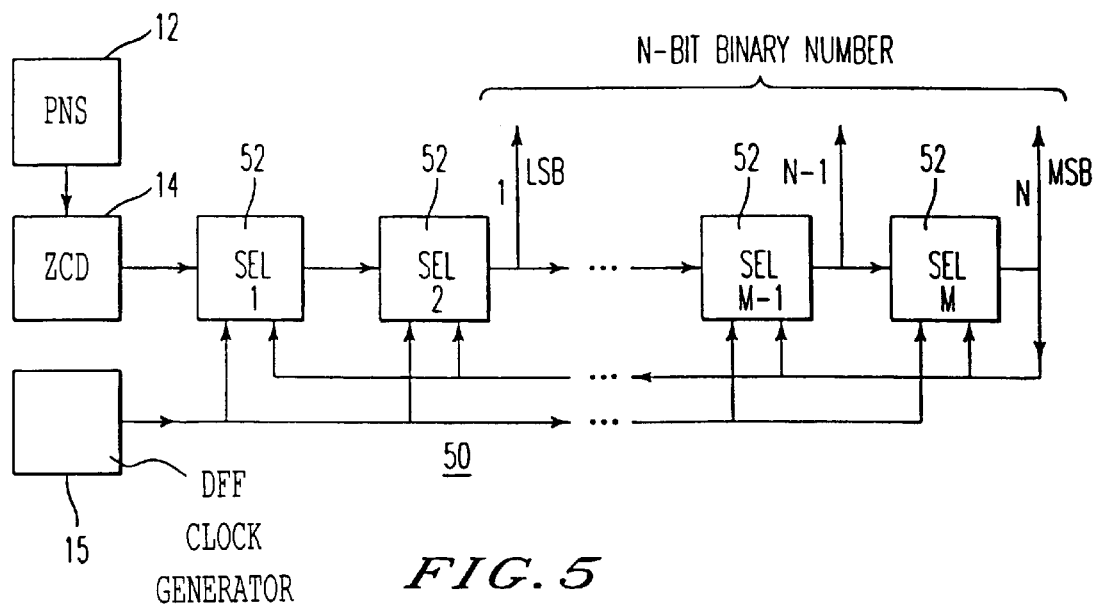
FIG. 5 is a block diagram of a specific embodiment of a hybrid chaos number generator according to the invention.

FIG. 5 shows a specific example of a hybrid chaos generator 50 according to the present invention. This uses a similar technique for generation of a primary binary sequence. The generator 50 also comprises a wideband physical noise source (PNS) 12 followed by a zero crossing detector (ZCD) 14, and a suitable clock generator 15. The binary waveform from the ZCD 14 is sampled by the first of a plurality of sequential elements (SEL's) 52 forming a shift register with feedback. The number M of sequential elements employed can be equal to, or preferably larger, than the number N of bits used to represent output N-bit numbers, i.e., preferably M=N+X.

Figure 6:
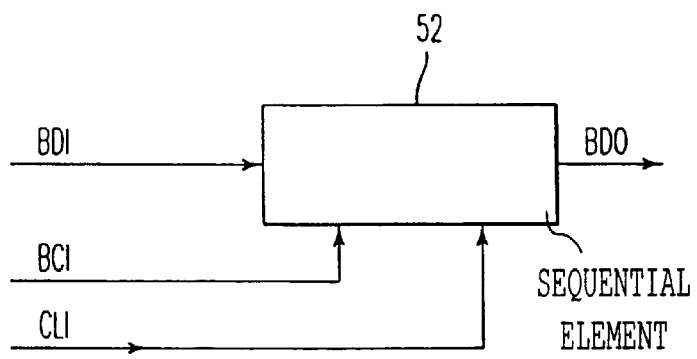
FIG. 6 is a functional block diagram of a sequential element (SEL) of the hybrid chaos number generator.

A functional block diagram of a sequential element (SEL) is shown in FIG. 6. Each SEL is a flip-flop with suitable auxiliary circuits and has a binary data input BDI, a binary data output BDO, a binary control input BCI and a clock input CLI.

The operation of the hybrid chaos generator 50 is summarised as follows.

When the most significant bit (MSB) of an output number assumes value zero, the bit pattern stored in the register is shifted to the right, thus implementing the "multiply-by-two" operation required to realize the first branch of the tent map, defined by the upper line of equation (1). The random bit, 0 or 1, shifted into the leftmost SEL is supplied by sampling the primary binary sequence obtained from the ZCD 14; this 'appended' random bit represents an error resulting from the feedback mechanism operating only on finite number of bits.

When the most significant bit (MSB) of an output number assumes value one, all the bits stored in the register are inverted (reversed) and such modified bit pattern is shifted to the right, thus implementing the "complement and multiply-by-two" operation required to realize the second branch of the tent map, defined by the lower line of equation (1). The random 'error' bit, 0 or 1, shifted into the leftmost SEL is now equal to an inverted bit supplied by sampling the output of the ZCD 14.

Irrespective of the distribution of bits occurring in the primary binary sequence supplied by the ZCD 14, the errors introduced when implementing the two branches of the tent map will cancel out in the long run because each output binary number will result with equal probability from either branch of the tent map. This property of 'equal probability' for the two branches of the tent map follows from the chaos mechanism exploited in the present invention, including 'stretching' (i.e., bit shifting, equivalent to multiplying by two) and 'folding' (i.e., bit reversal).

Figure 7:
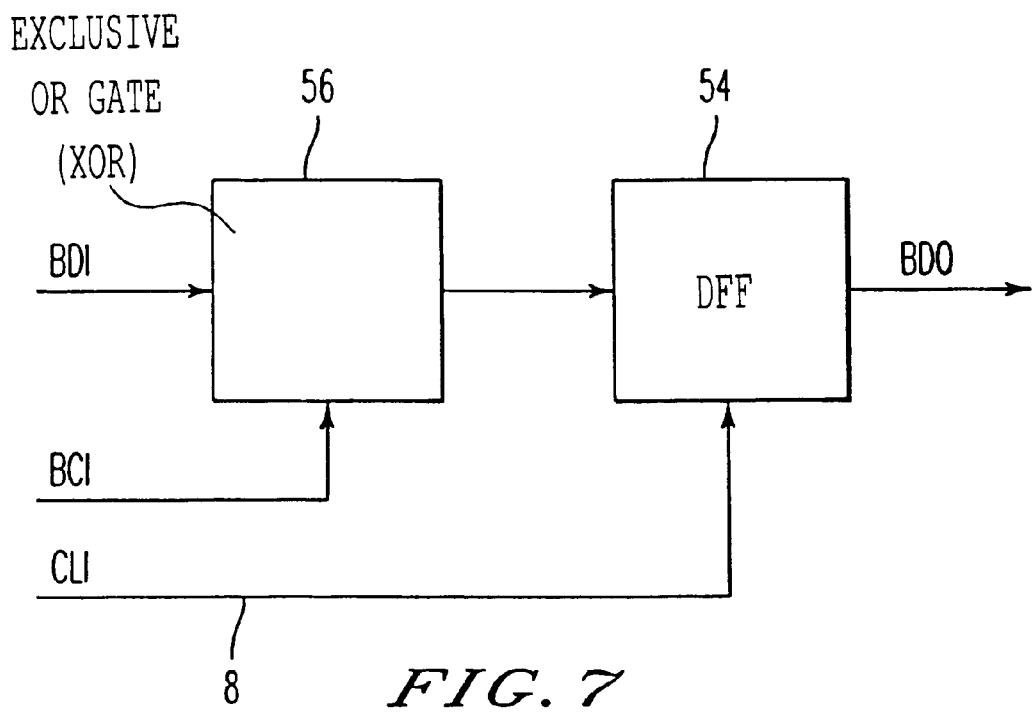
FIG. 7 shows one example of an implementation of an SEL.

FIG. 7 is a specific example of an implementation of an SEL 52. The SEL 52 comprises a D-type flip-flop (DFF) 54 and an Exclusive-OR gate (XOR) 56 driving the input of the flip-flop. When the control bit at BCI is zero, the input bit of XOR 56 at BDI is transferred to the flip-flop at the time instant determined by the clock pulse at CLI. When the control bit at BCI is one, the input bit of XOR 56 at BDI is inverted and then transferred to the flip-flop at the time instant determined by the clock pulse at CLI.

Figure 8:
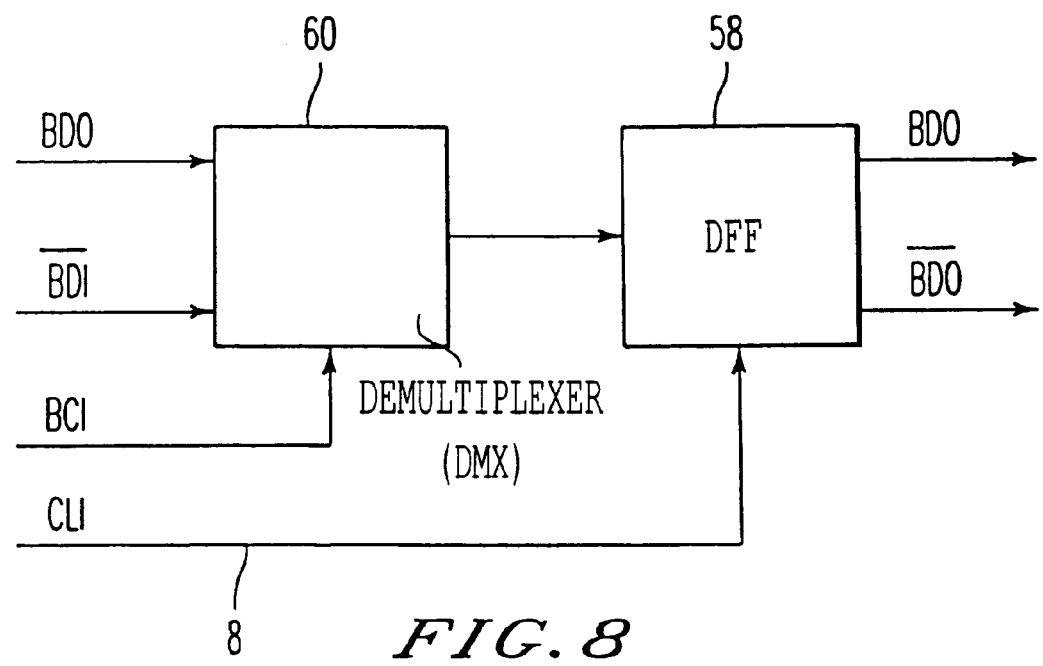
FIG. 8 shows another example of an implementation of an SEL.

FIG. 8 is another example of an implementation of an SEL 52 according to the invention. The SEL 52 comprises a D-type flip-flop (DFF) 58 with complementary outputs (BDO and $\overline{BDO}$) and a demultiplexer, or a data selector, (DMX) 60. When the control bit at BCI is zero, the bit from the non-inverted input BDI of DMX is transferred to the flip-flop at the time instant determined by the clock pulse at CLI. When the control bit at BCI is one, the bit from the inverted input $\overline{\text{BDI}}$ of DMX is transferred to the flip-flop at the time instant determined by the clock pulse at CLI.

Many other implementations of SEL's can be developed by those skilled in the art.

Figure 9:
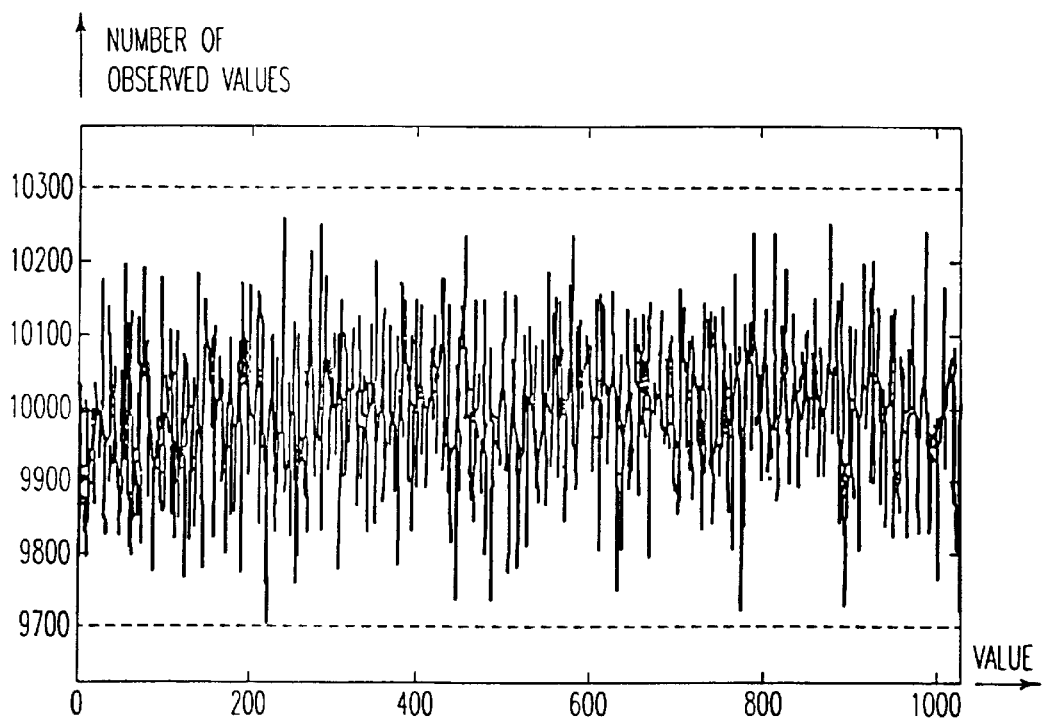
FIG. 9 is an experimental histogram of number values produced by a specific example of the hybrid chaos generator of FIG. 5.

The hybrid chaos generator of FIG. 5 comprising eleven SEL's 52 has been simulated. Ten consecutive outputs, including the most significant bit (MSB), have been used to represent 1024 binary numbers from the interval (0, 1, ..., 1022, 1023). It was assumed that the bits supplied by the output of ZCD 14 were not equiprobable; the fraction of ones was equal to 0.75. A set of 10,240,000 numbers produced by the hybrid chaos generator was recorded and analyzed. The expected number of each value from the interval (0, 1, ..., 1022, 1023) was equal to 10,000. An experimental histogram of observed values is presented in FIG. 9 along with the 95% confidence interval shown in broken line. As seen, the distribution of generated numbers is uniform and the statistical error is within the calculated confidence interval.

Although the hybrid chaos generator is capable of producing uncorrelated and uniformly distributed numbers, those numbers are not strictly speaking random. This follows from the fact that since the number generation procedure is based on a deterministic non-linear equation (2), the next value can be predicted from the current value either precisely or with a relatively small error. Such high predictability is not acceptable in most practical applications.

Numbers with greater unpredictability can be obtained when each number is produced by a different segment of the primary binary sequence from the ZCD 14. However, because such 'decimation' would limit the speed of operation of the hybrid chaos generator, such a technique is not preferred.

According to a preferred embodiment of the invention the uncorrelated and uniformly distributed numbers produced by the hybrid chaos generator are made completely unpredictable by XOR'ing them bit by bit with truly random, and not necessarily uniformly distributed, bits supplied by an auxiliary binary sequence (ABS). The resulting truly random numbers are uniformly distributed and they also exhibit maximum unpredictability.

Figure 10:
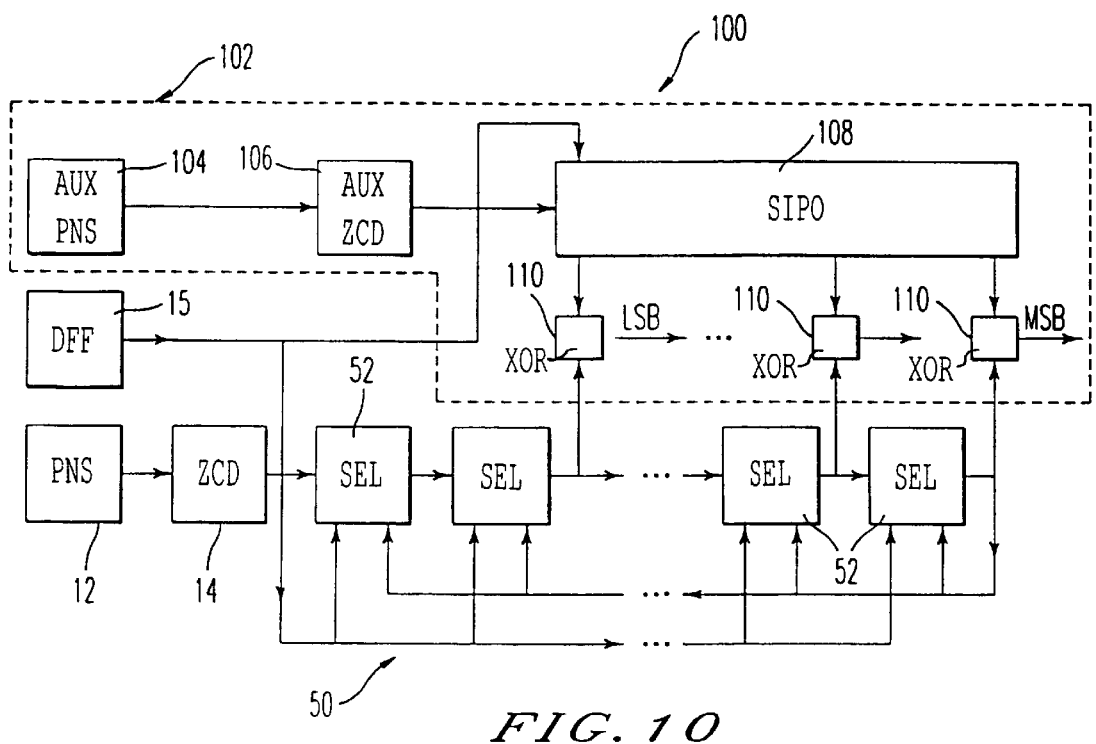
FIG. 10 is a block diagram of a hybrid chaos generator incorporating a randomisation subsystem, which forms a random number generator according to the invention.

FIG. 10 shows a random number generator 100 incorporating the hybrid chaos generator 50 of FIG. 5 and a randomisation subsystem 102. The randomisation subsystem comprises an auxiliary physical noise source 104, an auxiliary zero-crossing detector 106 supplying an auxiliary, binary sequence, a serial-in-parallel-out shift register (SIPO) 108 and a plurality of exclusive-OR gates 110. Each bit of an uncorrelated and uniformly distributed number, produced by the hybrid chaos generator, is XOR'ed with a respective one of the random bits stored in the SIPO 108 and supplied by the auxiliary binary sequence from ZCD 106. The bits obtained at the outputs of the exclusive-OR gates 110 form a uniformly distributed random number with maximum unpredictability.

Figure 11:
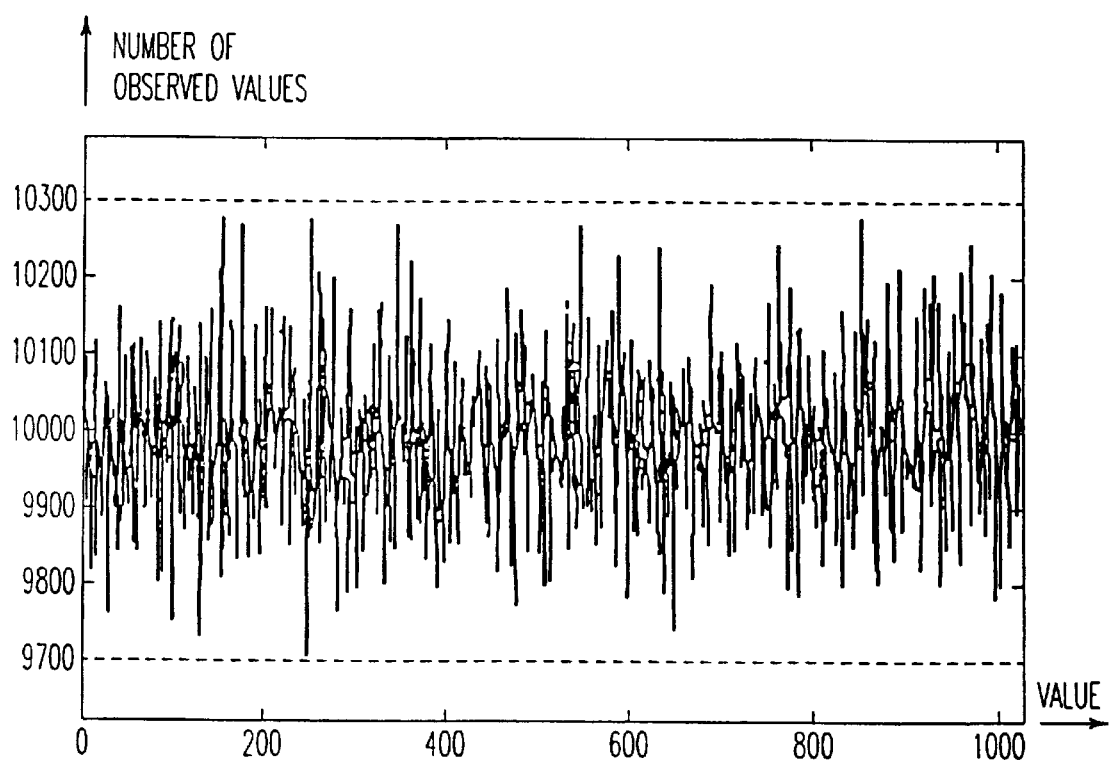
FIG. 11 is an experimental histogram of number values produced by a specific example of the random number generator of FIG. 10.

The random number generator 100 comprising eleven SEL's has been simulated. Ten consecutive outputs, including the most significant bit (MSB), have been used to represent 1024 binary numbers from the interval (0, 1, ..., 1022, 1023). It was assumed that bits supplied at the output of ZCD 14 were not equiprobable; the fraction of ones was equal to 0.7. It was also assumed that bits supplied by the auxiliary binary sequence at the output of ZCD 106 were not equiprobable and the fraction of ones was equal to 0.6. A set of 10,240,000 numbers produced by the hybrid chaos generator incorporating the randomisation subsystem was recorded and analyzed. The expected number of each value from the interval (0, 1, ..., 1022, 1023) was equal to 10,000. An experimental histogram of observed values is presented in FIG. 11 along with the 95% confidence interval shown in broken line. As seen, the distribution of generated numbers is uniform and the statistical error is within the calculated confidence interval.

Figure 12:
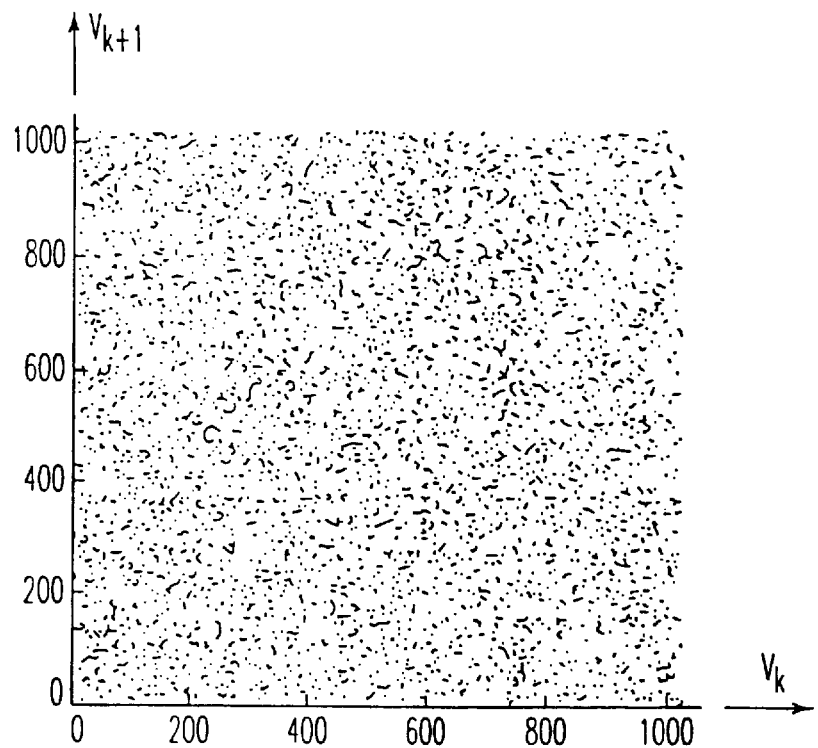
FIG. 12 is a scatterplot of consecutive and overlapping pairs of numbers produced by the specific example of the random number generator.

In order to demonstrate maximum unpredictability of random numbers produced by the hybrid chaos generator incorporating the randomisation subsystem, consecutive and overlapping pairs of numbers $\{(v_{k+1}, v_k); k=0, 1, ..., 6000\}$ were plotted as points filling the 1023×1023 square. As seen from the scatterplot, shown in FIG. 12, the points do not form any distinctive pattern to facilitate predictability of generated numbers.

Figure 13:
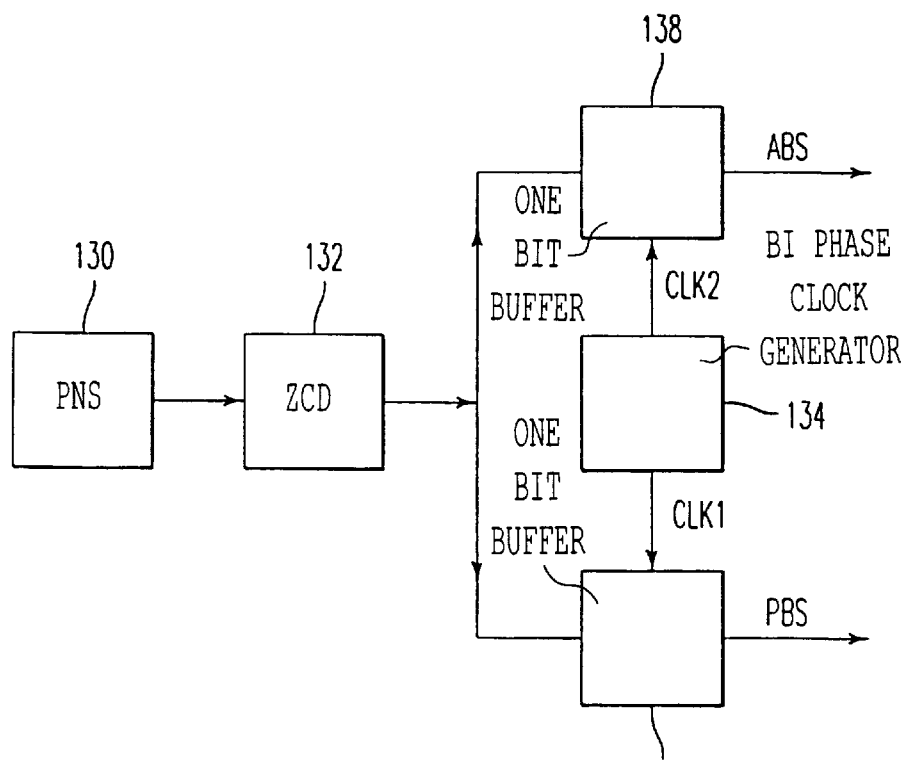
FIG. 13 is a block diagram of a modification which can be applied to the random number generator of FIG. 10.

FIG. 13 is a block diagram of a modification which can be applied to the random number generator 100 of FIG. 10. The modification uses a single physical noise source to produce both the preliminary binary sequence (PBS) and the auxiliary binary sequence (ABS). The system comprises a physical noise source 130, a zero-crossing detector 132, a biphase clock generator (BCG) 134 and two one-bit buffers, 136 and 138. Random bits supplied by the ZCD 132 are transferred respectively to buffers 136 and 138 at time instants determined by alternating clock pulses supplied by the BCG 134.

Various modifications to the described embodiments are possible.

For example, although it is preferred as in the above embodiments for the primary binary source to be truly random, a deterministic source, for example a pseudorandom bit source which may use recirculating or feedback shift registers, could be employed. Preferably, however, the continuous source produces a non-repeating sequence, or at least a sequence having a long repetition period.

Instead of using a separate source to randomise the uniformly-distributed sequence, the sequence outputs can themselves be manipulated in order to increase unpredictability. For example, each bit could be exclusive-OR'ed with another bit, and the bits which are combined in this way can be varied from number to number, possibly in a random fashion.

If desired, two (or more) generators could be used to provide respective uniformly-distributed sequences, and the outputs could be combined (e.g. by interspersing or exclusive-OR'ing) to reduce predictability.

It is preferred, as in the above embodiments, for the shift register formed by SEL's 52 to have more than N stages, for an N-bit output, and for at least the least significant stage not to form part of the N-bit output. The reason for this is that it reduces the error caused by performing the tent map algorithm on a finite number of bits, and hence increases the uniformity of the distribution of numbers. However, it is not essential that this technique be used.

In the above embodiments, the most significant bit is used to control the selective inversion of the bits in the SEL's during the shifting operation. However, instead, it would be possible to use a plurality of bits, for example the most significant bit and the next-most significant bit, for collectively determining whether inversion should occur. In such a situation, however, it may be desirable for the shift operation to be a two-bit shift, with two new bits from the continuous sequence being fed to the shift register to replace the two bits shifted out. (This is equivalent to the operation of the embodiments described above, but taking only alternate outputs of the SEL's 52.)

Figure 1:
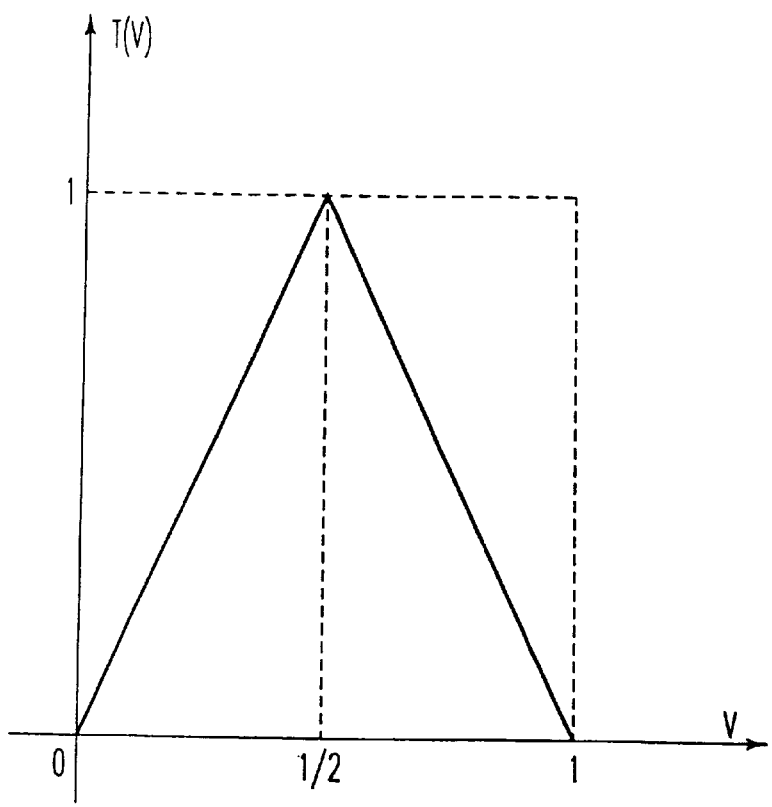
FIG. 1 shows a tent map having characteristics which can be exploited for the generation of chaotic numbers.

Bits other than the most significant bit could be used to control the selective inversion operation. However, the resulting operation would then differ from that represented by the tent map of FIG. 1, though it would still be representable by a piece-wise linear map, as obtained by "stretching and folding". In some cases, this would give rise to a sequence which is uniformly distributed over a subset of the possible outputs, the subset being determined by the initial value in the SEL's 52. Nevertheless, this may be useful, and indeed the effective memory of such a system may have advantages in some situations. Alternatively, a supplementary mechanism may be used to alter the value in the SEL's 52 to shift between subsets.

In the above embodiments, the non-repeating uniformly-distributed sequence is obtained by taking, for each number in the sequence, the bits stored in N adjacent SEL's 52. However, the N bits need not be acquired from adjacent SEL's. Nor is it necessary, as in the arrangement of FIG. 10, for each bit of the number to be XOR'ed with the corresponding bit of the random number from the auxiliary bit source, the XOR'ing could take place between non-corresponding bits, and indeed the pairs of bits which are combined in this way could be changed from number to number.

If desired, the uniformly-distributed sequence could be obtained from a single output of the shift register formed by SEL's 52, either by forming each N bit number from N successive outputs of this stage, or by using N shift registers, and forming the N bit output by taking one bit from each shift register.

Although the invention has been described in context of shifting bits into and out of a shift register, it would be possible instead to use digits of higher order, for example by using parallel arrangements of shift registers. The digits at each stage may be stored in any convenient form; for example, decimal digits could be stored in BCD form.

The system can be arranged so that the complement formed of the value currently stored in the register is either the base complement or the base-minus-one complement.

A random binary waveform generated in accordance with the present invention is particularly suited for constructing a probing or interrogating signal for use in a shift determination system according to UK patent application no. 9828693.3, the contents of which are incorporated herein by reference.

What is claimed is:

1. A method of generating a non-repeating sequence of numbers having a substantially uniform distribution, the method comprising:
   shifting digits out of a shift register;
   using successive digits from a continuous sequence thereof to replace said digits shifted out of the shift register; and
   using the contents of at least one stage of the shift register to control whether the contents of the shift register are replaced by their complement, so that the shift register has changing contents which can be used to derive said non-repeating sequence.

2. The method as claimed in claim 1, wherein each number of the non-repeating sequence is derived from N stages of the shift register, wherein N is an integer greater than 1.

3. The method as claimed in claim 2, wherein the shift register has N+X stages, wherein X is an integer of one or more.

4. The method as claimed in claim 3, wherein the N stages of the shift register from which each number is derived excludes at least the least significant stage of the shift register.

5. The method of claim 1, wherein the contents of the most significant stage of the shift register is used to control whether the contents of the shift register are replaced by their complement.

6. The method of claim 1, wherein the operations of shifting the contents of the shift register and selectively replacing the contents by their complement are such as to cause alternate stretching and folding of the contents.

7. The method of claim 1, wherein the operations of shifting the contents of the shift register and selectively replacing the contents by their complement are such that the shift register contents are altered in accordance with a tent map.

8. The method of claim 1, wherein the continuous sequence of digits is a non-repeating sequence.

9. The method of claim 1, wherein the continuous sequence of digits is derived from a non-deterministic source.

10. A method of generating a non-repeating sequence of numbers having a substantially uniform distribution within a predetermined interval, the method comprising:
    providing a sequence of digits and repeatedly doubling a value of a group of said sequence of digits to produce a result; and
    replacing the result by its complement in dependence on said value, wherein
    said step of providing includes successively replenishing the group with digits from said sequence.

11. The method of claims 1–10, further comprising:
    the digits shifted out of the shift register with substantially random numbers.

12. The method as claimed in claim 11, further comprising:
    producing the random numbers with a non-deterministic source.

13. The method as claimed in claim 12, wherein said step of producing the sequence of random numbers with a non-deterministic source comprises:
    producing the sequence of random numbers with a thermal noise source.

14. The method of claim 11, further comprising:
    producing both the continuous sequence of digits and the random numbers with a common source.

15. The method of claim 14, wherein the combination of numbers from the non-repeating sequence with the random numbers is performed by exclusive OR-ing each bit of the random number with a respective bit of a number from the non-repeating sequence.

* * * * *